3,291,642
CATALYTIC ELECTRODE BODY AND METHOD OF MANUFACTURE

Margarete Jung, Nieder-Eschbach, Taunus, and Hanns H. Kroeger, Hamburg-Gross Flottbeck, Germany, assignors to Varta Aktiengesellschaft, Frankfurt am Main, Germany, a corporation of Germany
No Drawing. Filed Jan. 9, 1962, Ser. No. 165,210
Claims priority, application Germany, Jan. 27, 1961, A 36,591
15 Claims. (Cl. 136—86)

The present invention relates to catalytic bodies, and more particularly to catalytic electrodes used in fuel cells, as well as to a method for their manufacture.

Catalytic electrodes for use in galvanic cells are well known. It has been proposed, for instance, to use pure sintered nickel electrodes in fuel cells. However, the activity of such pure nickel electrodes is not sufficint to convert the chemical energy of the fuel to electrical energy unless the fuel is under high pressure and the operating temperature of the cell is about 200° C.

It has also been proposed to use a type of electrode wherein a catalytic substance is distributed throughout and carried in a catalytically inactive supporting matrix. Such an electrode may be produced, for instance, by intimately mixing carbonyl nickel powder with Raney nickel alloy powder and sintering the mixture, the weight ratio of carbonyl nickel to Raney nickel being about 20:80 to 80:20. However, to obtain a mechanically stable electrode body, sintering temperatures between 700° C. and 1,100° C. must be used.

It is almost impossible to sinter at temperatures above 800° C., because at this and higher temperatures the aluminum of the Raney nickel alloy reacts spontaneously with the nickel powder of the matrix, for instance, carbonyl nickel powder having grain sizes between $5\mu$ and $12\mu$, thereby forming an alloy. Thus, the resulting NiAl cannot be activated by a treatment with concentrated alkali metal hydroxide solutions.

For this reason, it has been necessary very carefully to observe specific sintering conditions, thus causing considerable manufacturing difficulties.

It is the primary object of the present invention to obviate these advantages of known catalytic electrode bodies and to provide such new and highly effective bimetallic lattice electrode bodies.

It is a concomitant object of this invention to provide a simple manufacturing method for producing such catalytic bodies.

These and other objects are accomplished in accordance with the invention by providing a catalytic body, such as a fuel cell electrode, which comprises a supporting matrix of an electron-conducting, catalytically not activable alloy which does not react with a Raney alloy at sintering temperatures, and a Raney alloy distributed throughout and carried in said matrix. Such a Raney alloy may have a high content of a catalytically inactive component, the mole ratio of the catalytically active component of the alloy to the inactive component being, for instance, in the range of 1:1.5 to 1:3.

A further advantage of using said nickel aluminum alloy (NiAl) instead of pure nickel powder for the supporting matrix is its considerably lower specific weight.

According to a preferred embodiment of the invention, the supporting matrix consists of an intermetallic compound of the composition NiAl. The preferred Raney alloy is the intermetallic compound $NiAl_3$. The preferred weight ratio of $NiAl:NiAl_3$ is between about 1.5:1 and about 4:1, most advantageously 2:1 to 2.5:1.

When such a mixture is sintered, no reaction will take place between the supporting matrix compound and the catalytic substance at the sintering temperature. Also, any recrystallization of the catalytic substance is avoided so that the catalyst may be fully used in the conversion of the fuel to electrical energy in the fuel cell after the electrode has been activated in the conventional manner, i.e. by dissolving the aluminum out of the Raney alloy by a treatment with an alkali metal hydroxide solution.

The manufacturing method of this invention comprises the steps of intimately mixing a powder of the alloy forming the supporting matrix with a Raney alloy powder, compressing the intimately mixed powders into the shape of a catalytic body, sintering the compressed powder body, and activating the Raney catalyst.

In the preferred embodiment, about 1.5 parts to 4.0 parts, by weight, preferably 2.0 parts to 2.5 parts, of the nickel-aluminum alloy of the composition NiAl in powder form are intimately mixed with one part of the Raney nickel alloy of the composition $NiAl_3$ in powder form, the intimately mixed powders are compressed under a pressure of 2 tons to 8 tons/sq. cm., preferably 3 tons to 5 tons/sq. cm., and the compressed powder body is sintered at a temperature between about 750° C. and 1100° C., preferably 850° C. and 1050° C., for a period of about two to ten minutes, preferably three to five minutes. Activation of the Raney alloy, for instance, of the composition $NiAl_3$, is effected in the conventional manner, by dissolving the aluminum out of the alloy by a treatment with an alkali metal hydroxide solution.

The invention will be more fully illustrated in the following examples. The first three examples are directed to the preparation of an alloy for the supporting matrix of the catalytic body.

Example 1

An intimate mixture of 31.2%, by weight, of aluminum powder and 68.8%, by weight, of nickel powder is heated in a crucible to a temperature of 760° C. under a calcium chloride ($CaCl_2$) flux until they spontaneously react with each other to form an intermetallic compound. After cooling, the regulus is freed of calcium chloride by a treatment with water and is milled to a powder of the desired grain size. A grain size of $4\mu$ to $20\mu$ was found useful.

Example 2

15.6 g. of aluminum granules were melted under a calcium chloride flux and 34.4 g. of a nickel powder were gradually added to the melt while the same was stirred. The resultant reaction product was cooled, freed of the flux, and milled, as in Example 1.

Example 3

33 g. of Raney nickel powder (containing an equal weight of Ni and Al) and 20 g. of carbonyl nickel powder were intimately mixed and the mixture was heated in a crucible under a calcium chloride flux to 1000° C. After completion of the reaction, the regulus was treated as in Examples 1 and 2.

Any of the above alloys may be used for the supporting matrix to produce a catalytic body according to the following examples.

Example 4

The supporting matrix alloy was intimately mixed with a Raney nickel powder (40% of nickel and 60% of aluminum, by weight) in a weight ration of 2:1. In this case such a Raney nickel powder 40% Ni/60% Al can be used, because there is no risk of forming an alloy with the supporting matrix alloy NiAl. The mixture was compressed under a pressure of 5 tons/sq. cm. and the molded powder mixture was sintered under a protective hydrogen atmosphere at a temperature of 1000° C. for five minutes. The round electrode had a diameter of 60 mm. and a strength of 3 mm. The grain size of the Raney nickel powder was 16–20$\mu$, and that of the matrix alloy NiAl 9–12$\mu$.

Example 5

The supporting matrix alloy was intimately mixed with a Raney nickel alloy (50 parts, by weight, of nickel and 50 parts, by weight, of aluminum) in a weight ratio of 2.5:1. The mixture was compressed under a pressure of 5.5 t./sq. cm. and then sintered at a temperature of 1050° C. for 2.5 minutes under a hydrogen atmosphere. The rectangular electrode had the dimensions of 40 mm. x 40 mm. x 2.5 mm. The grain size of the Raney nickel powder was 6–7$\mu$, and that of the matrix alloy NiAl 6–8$\mu$.

Example 6

35 g. of calcium chloride was melted in a graphite crucible, then 40 g. of zinc granules (99.99% Zn) were gradually added and also melted by increasing the temperature sufficiently. As soon as the zinc was molten, a mixture of 3.6 g. of powdered silver, 5 g. of nickel, and 5 g. of cobalt was added in portions thereto. The temperature was increased to 950° C. while continuously stirring the melt. After cooling, the metallic regulus is freed of calcium chloride by washing with water and is milled to a powder of a grain size between about 5$\mu$ and about 9$\mu$.

20 g. of this powder were thoroughly mixed with 45 g. of the supporting matrix alloy (NiAl in a weight ratio of one part of aluminum to 2.2 parts of nickel) with a grain size between 11$\mu$ and 12$\mu$ and then compressed under a pressure of 4 tons/sq. cm. The molded powder mixture was sintered as described in Example 4.

Details about sintering of electrodes are known to those skilled in the art and can also be learned from the book "Powder Metallurgy," Interscience Publishers, New York (Library of Congress Catalog Card 61–9446).

The sintered bodies of Examples 4 to 6 were catalytically activated by subjecting them to a treatment with a highly concentrated potassium or sodium hydroxide solution, as conventionally used in the activation of Raney catalysts. The resultant catalytic bodies were built into fuel cells to serve as catalytic electrodes in the conversion of the chemical energy of fuels, such as hydrogen, to electrical energy.

In addition to the peculiar property of the nickel aluminum compound NiAl already amply described hereinabove, not to form alloys at temperatures below the melting point with the catalyst, such as Raney nickel, and to be of lower specific gravity than nickel, said nickel aluminum alloy NiAl has the further advantage of conducting the electric current better than nickel.

Another advantage of the catalytic electrodes according to the present invention is their superior behavior under load as by the comparative values evidenced, for instance, given hereinafter. These values were obtained on carrying out continuous tests with conventional electrodes and with electrodes according to the present invention for 2000 hours.

Electrodes I and II were "double skeleton-electrodes" as described, for instance in U.S. Patent No. 2,928,891, while electrodes III and IV were made according to Examples 5 and 6.

The polarisation was measured opposite a reversible $H_2$-electrode.

| Electrode No. | Temperature (° C.) | Load (ma./sq. cm.) | Polarization (mv.) |
| --- | --- | --- | --- |
| I | 19 | 62 | 148 |
| II | 23 | 97 | 161 |
| III | 19 | 176 | 197 |
| IV | 21 | 191 | 189 |

While the invention has been described in connection with certain preferred embodiments, it will clearly be understood that many variations and modifications may occur to the skilled in the art without departing from the spirit and scope of the invention, as defined in the appended claims.

We claim:

1. A catalytic electrode body comprising a supporting matrix of the intermetallic nickel aluminum compound of the composition NiAl and a Raney metal catalyst distributed throughout and carried in said matrix.

2. A catalytically activable electrode body comprising a supporting matrix of the intermetallic nickel aluminum compound of the composition NiAl and the Raney nickel aluminum alloy of the composition $NiAl_3$ distributed throughout and carried in said matrix.

3. The catalytically activable electrode body of claim 2, wherein the weight ratio of NiAl:$NiAl_3$ is between about 1.5:1.0 and about 4.0:1.0.

4. The catalytically activable electrode body of claim 3, wherein the weight ratio of NiAl:$NiAl_3$ is between 2.0:1.0 and 2.5:1.0.

5. A method of producing a sintered catalytic electrode body comprising the steps of intimately mixing a powder of an electron-conducting, catalytically not activable intermetallic which compound does not react with a Raney metal alloy at sintering temperatures, with a powder of a Raney nickel aluminum metal alloy having a high content of a catalytically inactive component, compressing the intimately mixed powders into the shape of said body, sintering the compressed powder body, and activating the sintered body to convert it into a Raney metal catalyst containing body.

6. A method of manufacturing a sintered catalytic electrode body, comprising the steps of intimately mixing an intermetallic nickel aluminum compound powder of the composition NiAl with a Raney nickel aluminum alloy powder of the composition $NiAl_3$, compressing the intimately mixed powders into the shape of said electrode body, sintering the compressed powder body, and activating the sintered body to convert it into a Raney metal catalyst.

7. The method of claim 6, wherein the weight ratio of NiAl:$NiAl_3$ is between about 1.5:1.0 and about 4.0:1.0.

8. The method of claim 7, wherein the weight ratio of NiAl:$NiAl_3$ is between 2.0:1.0 and 2.5:1.0.

9. The method of claim 6, wherein the powders are compressed under a pressure of between 2 tons and 8 tons/sq. cm.

10. The method of claim 9, wherein the pressure is between about 3 tons and 5 tons/sq. cm.

11. The method of claim 6, wherein the compressed powder body is sintered at a temperature between about 700° C. and 1100° C. for about two to ten minutes.

12. The method of claim 11, wherein sintering is effected at a temperature between 850° C. and 1050° C. for four to six minutes.

13. A method of manufacturing a sintered catalytic electrode body, comprising the steps of intimately mixing an intermetallic nickel aluminum compound powder of the composition NiAl with a Raney nickel aluminum alloy powder of the composition $NiAl_3$ in a weight ratio of NiAl:NiAl$_3$=1.5:1.0 to 4.0:1.0, compressing the intimately mixed powders into the shape of the electrode body under a pressure of between 2 tons and 8 tons/sq. cm., sintering the compressed powder body at a temperature between about 700° C. and 1100° C. for about two to ten minutes, and activating the sintered body to convert it into a Raney metal catalyst.

14. A fuel cell having a catalytic fuel electrode comprising a supporting matrix of an electron-conducting, catalytically not activable intermetallic compound alloy which does not react at sintering temperatures with a Ranel nickel aluminum metal alloy and a Raney metal catalyst distributed throughout and carried in said matrix.

15. A catalytic electrode body comprising a supporting matrix of an electron-conducting, catalytically not activable nickel aluminum compound which does not react at sintering temperatures with a Raney metal alloy containing at least one of the following: aluminum and zinc, and a Raney metal catalyst of at least one of the following: nickel and cobalt distributed throughout and carried in said matrix.

References Cited by the Examiner
UNITED STATES PATENTS 2,884,688   5/1959   Herz _____ 29—182

FOREIGN PATENTS 806,644   12/1958   Great Britain.

WINSTON A. DOUGLAS, *Primary Examiner.*

H. FEELEY, N. P. BULLOCH, *Assistant Examiners.*

JOHN R. SPECK, ALLEN B. CURTIS, *Examiners.*